United States Patent [19]

Figge et al.

[11] 4,201,612

[45] May 6, 1980

[54] BONDING PLASTIC LAYERS

[75] Inventors: Irving E. Figge, Newport; Edward H. Dean, Newport News, both of Va.

[73] Assignee: The United States of America as represented by the Secretary of the Army, Washington, D.C.

[21] Appl. No.: 906,187

[22] Filed: May 15, 1978

[51] Int. Cl.² .......................... C09J 5/00; B32B 31/16; B32B 1/10; B29C 17/03
[52] U.S. Cl. .................... 156/224; 264/257; 264/265; 264/266; 264/275; 156/221; 156/222; 156/285; 156/322; 264/292; 264/DIG. 78; 428/174; 428/417; 428/500; 428/521; 428/522
[58] Field of Search ............... 156/221, 222, 224, 322, 156/285; 264/257, 265, 266, 275, 292, DIG. 78; 428/417, 174, 500, 521, 522

[56] References Cited

U.S. PATENT DOCUMENTS

| | | | |
|---|---|---|---|
| 2,590,221 | 3/1952 | Stevens | 156/224 X |
| 2,797,179 | 6/1957 | Reynolds et al. | 156/224 X |
| 3,140,325 | 7/1964 | Gräff | 156/224 X |
| 3,446,686 | 5/1969 | Butler et al. | 156/224 |

*Primary Examiner*—William A. Powell
*Assistant Examiner*—Robert A. Dawson
*Attorney, Agent, or Firm*—Nathan Edelberg; Robert P. Gibson; Norman L. Wilson, Jr.

[57] ABSTRACT

Thermoforming, utilized for making articles from sheets of thermoplastic resins, does not always yield articles having desired strength properties. It has been suggested that both thermoplastic and thermosetting layers be used to making the articles stronger. However it was virtually impossible to bond the layers together. A process is provided herein for obtaining that bond.

1 Claim, 3 Drawing Figures

BONDING PLASTIC LAYERS

BACKGROUND OF THE INVENTION

This invention relates to molded articles and to processes for their fabrication.

Thermoforming is utilized for making articles from sheets of thermoplastic resins, for example, acrylics (acrylonitrile polymers), polycarbonates, polyesters, polyimides, polypropylene, polystyrene and polyvinyl alcohol. One of the disadvantages of the process is that, using thermoplastic resins, it is not always possible to obtain the strength properties desired. As an example, thermoforming has been attempted for bodies of certain airborne objects. However it was found that such bodies readily cracked on landing. In order to increase the strength properties of these airborne objects it has been attempted to thermoform a thermoplastic body and then, using the same mold, spray up or lay up a thermoset body. The two molded articles were then to be bonded together to form a two ply airborne article. It was found however, that this method was unsatisfactory. It was not only difficult to get perfect fit with all surfaces of one body in contact with all bonding surfaces of the other, but an adhesive could not be found which bonded the thermoplastic piece to the thermoset counterpart. This is particularly true if the thermoset plastic is a cured epoxide resin. It is most difficult to bond an epoxide resin to a thermoplastic resin.

In view of this bonding problem it was decided to layup a fiber-reinforced epoxy resin on the previously thermoformed thermoplastic article to increase its strength properties. This process also proved to be unsatisfactory. The cured epoxy impregnated fiber cloth did not adhere to the thermoplastic article. However in accordance with this invention a process is provided wherein a fiber-reinforced epoxy resin layer is bonded to a mating thermoplastic resin layer.

SUMMARY OF THE INVENTION

By the practice of this invention thermosetting materials such as weft layers of fibers of glass, steel, "Kevlar" (a trademark for an aromatic polyamide fiber), graphite, or polyamide fibers impregnated with epoxy resins can be employed in thermoforming operations to improve the strength properties of the molded article. It has been found that if the epoxy resin is partially cured during the thermoforming operation the resulting layers are securely bonded together, i.e. fused, in the formed article. The sheet of epoxy resin impregnated weft is placed on the mold. The heated thermoplastic sheet is then lowered onto the epoxy resin sheet. Partial curing takes place as the layers are drawn over the mold to effect a strong bond between the thermoplastic and thermoset layers in the resulting article. The epoxy can subsequently be post cured if necessary, so long as the post cure temperature does not exceed the heat distortion temperature of the thermoform material.

DETAILED DESCRIPTION OF THE INVENTION

In thermoforming, a sheet of thermoplastic resin varying in thickness from 0.03 to 0.5 inch is clamped into a clamp frame and heated. An oven or heat station is utilized, which heats the edges as well as the center of the thermoplastic sheet so that, when it is subsequently delivered to a forming station, an overall temperature balance has been attained. On being heated, the sheet is conveyed to the forming station where by one of several methods, it is forced over a mold. In any thermoforming operation residual heat of the plastic must be removed as quickly as possible after forming. After cooling the end product is removed from the forming station and sent to a trim press where it is trimmed from the web.

Although thermoforming techniques have remained relatively unchanged over the years, there are about nine available thermoforming processes which have resulted from improvements. The differences in the processes depend upon whether a male or female mold is utilized, and upon how the vacuum is supplemented, for instance, plug assist, snap-back, pressure bubble and trapped sheet forming. Any of these processes can be utilized herein.

In order better to illustrate the invention we will now consider a preferred embodiment thereof in conjunction with the accompanying drawings. The drawings are diagramatic in nature in which.

Figure 1:
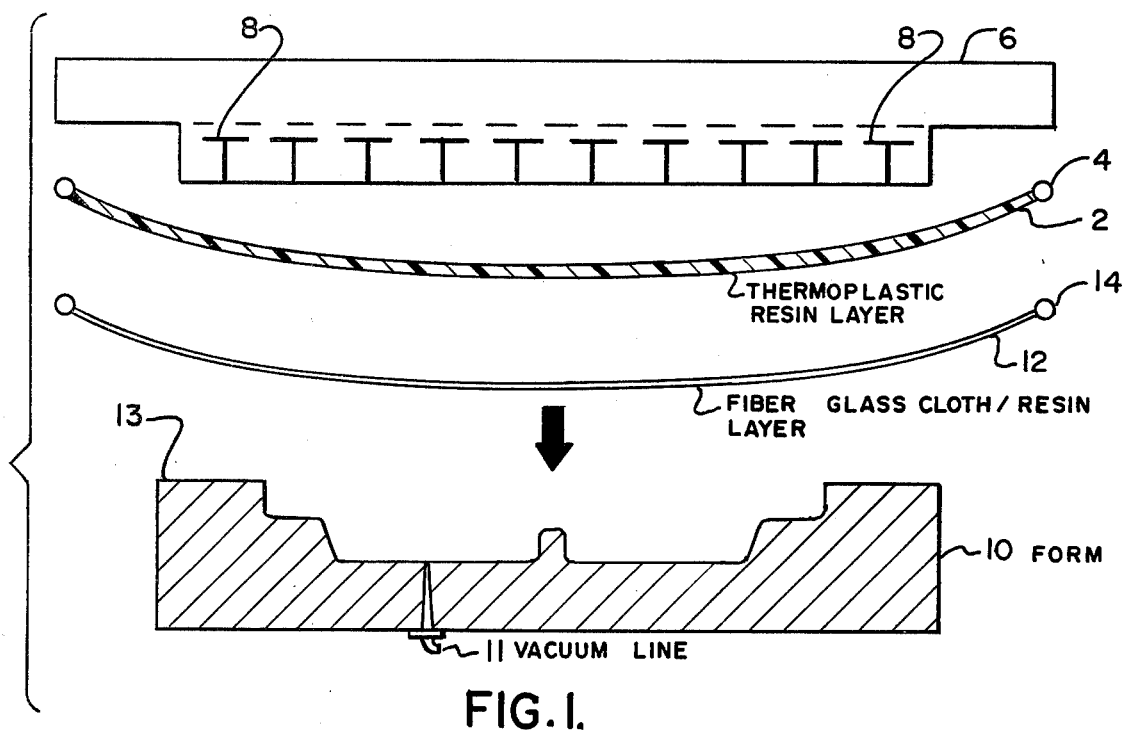
FIG. 1 shows the entire thermoforming apparatus.

Referring now to FIG. 1, a cut sheet 2, of thermoplastic material is secured in a clamp frame 4, which is automatically raised to heat station 6. The heat station is an oven containing radiant heating elements 8, positioned above a mold or form 10 provided with a vacuum line 11. Between clamp frame 4 and mold 10 is a second clamp frame 14 adapted to hold a lower sheet or layer 12. The upper sheet 2 is a sheet of an acrylonitrile-butadrenestyrene thermoplastic resin (ABS). The lower sheet 12 is a layer of glass fiber cloth impregnated with a liquid epoxide resin, that is, a low viscosity liquid glycidyl polyether of bisphenol having an epoxide equivalent of 190. The epoxy resin is combined with sufficient diethylene triamine to react with the epoxy groups to effect a cure.

During operation the thermoformed material is heated and transfers its heat to the thermoset material as contact occurs during vacuum forming. After heating sheets 2 and 12 are indexed onto a forming station 10 to form the laminated end product.

Figure 2:
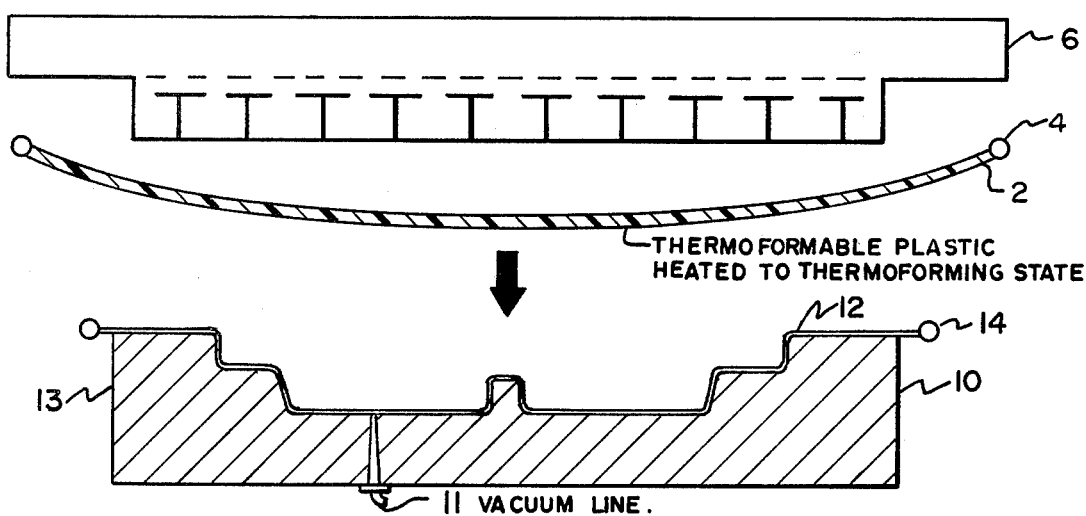
FIG. 2 shows the first stage of the thermoforming process.
Figure 3:
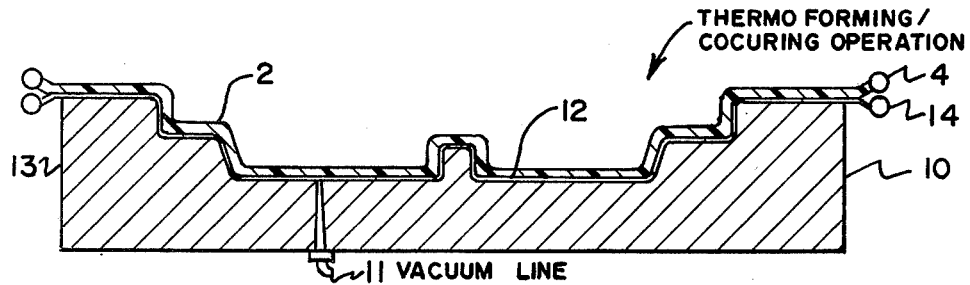
FIG. 3 shows the vacuum stage of the thermoforming process.

As seen in the drawings forming station 10 contains a mold 13 which is either a female member as shown, or a male member. Vacuum and pressure are the primary means employed to draw, or force, the plastic material into the required configuration. Clamp frame 14 is first lowered to forming station 10 where it seats as shown in FIG. 2. As the hermetic condition is created, the softened thermoplastic layer is superimposed thereon by lowering clamp frame 4. The vacuum beneath the sheets results in atmospheric pressure pushing the thermoplastic layer over the epoxy resin sheet to form a laminated sheet on the mold as shown in FIG. 3. Concomitantly the cross-linking of the epoxide resin begins so that as thermoplastic layer 2 cools and hardens, thermosetting layer 12 also hardens, adhering during the process to the thermoplastic layer. As a result a strong bond is formed between the two layers 12 and 2 without a bonding agent. The remaining cross linking reactions, depending upon the cross linking agent used, will then continue after the piece has been removed from the mold. The article can be heated, if necessary, to a temperature below the thermoforming temperature, generally the softening point of the thermoplastic resin used.

As indicated previously liquid resins are contemplated herein for use in impregnating the fibrous weft. Liquid epoxide resins are those glycidyl polyethers of bisphenol having epoxide equivalent weights below 250. It will be appreciated that all thermoplastic resins are not suited to the process particularly the polyalkenes such as polyethylene and polypropylene. Desirable thermoplastic resins are the acrylics, for instance acrylonitrile polymers, polyesters and polyimides. However variations in the process and in equipment in which it is carried out will occur to those skilled in the art. Such ramification and modifications are deemed to be within the scope of this invention.

What is claimed is:

1. A process for forming laminated articles in which an acrylic copolymer thermoplastic resin layer is bonded to a fiber reinforced epoxide resin thermoset layer which comprises strengthening the bond between the epoxy resin and acrylic resin layers by vacuum forming wherein a sheet of uncured fiber reinforced epoxy resin is placed over a vacuum forming mold, a thermoplastic acrylic copolymer sheet is heated to a vacuum forming temperature, and at said temperature the heated acrylic copolymer sheet and the epoxy resin sheet are vacuum formed while concomitantly the cross-linking of the epoxy resin takes place, ultimately effecting a complete cure, creating a strong bond between the thermoplastic and thermoset layers in the resulting laminated article.

* * * * *